United States Patent [19]

Sekimoto et al.

[11] 4,400,741
[45] Aug. 23, 1983

[54] VIDEO TAPE RECORDER WITH INTER-CHANNEL SWITCHING CIRCUIT FOR SPECIAL MODES OF REPRODUCTION

[75] Inventors: Kunio Sekimoto, Katano; Katsuhiko Yamamoto, Neyagawa; Chojuro Yamamitsu, Kawanishi; Kozo Kurashina, Yahata, all of Japan

[73] Assignee: Matsushita Electric Industrial Company, Limited, Osaka, Japan

[21] Appl. No.: 254,186

[22] Filed: Apr. 14, 1981

[30] Foreign Application Priority Data

Apr. 15, 1980 [JP] Japan .................................. 55-49715

[51] Int. Cl.³ .......................... H04N 9/491; H04N 5/78
[52] U.S. Cl. .................................... 358/312; 360/10.1
[58] Field of Search .......................... 358/4, 8, 9, 312; 360/10, 64, 70, 73, 10.1

[56] References Cited

U.S. PATENT DOCUMENTS

| | | | |
|---|---|---|---|
| 3,925,816 | 12/1975 | Kitara | 358/4 X |
| 4,197,562 | 4/1980 | Kikuya et al. | 360/64 X |
| 4,280,146 | 7/1981 | Misaki et al. | 360/10 |
| 4,283,737 | 8/1981 | Nikami | 360/10 X |

Primary Examiner—Aristotelis M. Psitos
Attorney, Agent, or Firm—Lowe, King, Price & Becker

[57] ABSTRACT

In a video tape recorder, luminance and chrominance signals are recorded respectively by first and second transducer heads along separate tracks skewed to the direction of tape motion. The transducer heads are rotated during particular modes such as slow-motion or still picture reproduction, in a tape-head speed relationship different from the normal tape-head speed relationship, causing the transducer heads to traverse several tracks. A switching circuit is coupled to the transducer heads to selectively connect the outputs of the heads to an output circuit in response to a point of transition of amplitude of the output signal from the second head to cancel unwanted signal components detected by the heads during traversal across the tracks.

10 Claims, 8 Drawing Figures

VIDEO TAPE RECORDER WITH INTER-CHANNEL SWITCHING CIRCUIT FOR SPECIAL MODES OF REPRODUCTION

BACKGROUND OF THE INVENTION

The present invention relates to a video tape recorder which permits reproduction of a noiseless slow-motion picture or the like.

In a video tape recorder of the type wherein luminance and chrominance signals are recorded on separate tracks skewed to the direction of tape travel, the transducer heads are rotated in a particular head-tape speed relationship different from the normal head-tape speed relationship when a slow-motion picture or the like is desired. As a result, the transducer heads traverse several tracks of different information during each horizontal scan, thus producing output signals which contain unwanted information. More specifically, the luminance signal is recorded on a track of a width greater than the width of the track on which the chrominance signal is recorded and each track is suitably separated by a guard band from other tracks, so that the signal reproduced by the luminance track head contains a portion of the chrominance signal which is partially intermixed with a portion of the luminance signal, while the signal reproduced by the chrominance track head contains a portion of the luminance signal which is interleaved with a portion of the chrominance signal.

SUMMARY OF THE INVENTION

In accordance with the present invention, a video tape recorder includes a changeover switch having its inputs coupled respectively to first and second transducer heads which respectively generate intermixed and interleaved signals of different information. The interleaved signals are utilized to detect a point of sharp transition of amplitude which occurs as the second transducer head traverses from one track to another. A switching control signal is derived from the detected transition point for operating the changeover switch for coupling the output of the second transducer head to an output circuit while the signal from the first transducer head is disabled or cut off, so that the signals from the first and second transducer heads are serially combined or interleaved to produce a luminance signal having no chrominance component.

In a preferred embodiment, the point of sharp transition is detected by an envelope detector which detects the envelope of the interleaved signal and a zero crossing detector for detecting when the detected envelope falls to a zero voltage level or a level close thereto. A filter is provided to separate a lower frequency component or Q signal component from the interleaved signal. A second envelope detector senses the envelope of the Q signal. A bistable device is responsive to the outputs of the first and second envelope detectors to generate a switching control signal.

A second changeover switch may be provided having its two input terminals coupled respectively to the first and second transducer heads. The same control signal as that applied to the first switch is applied to the second switch to interleave the outputs of the transducer heads to generate a chrominance signal.

BRIEF DESCRIPTION OF THE DRAWINGS

The invention will be further described in detail with reference to the accompanying drawings, in which.

DETAILED DESCRIPTION

Figure 1:
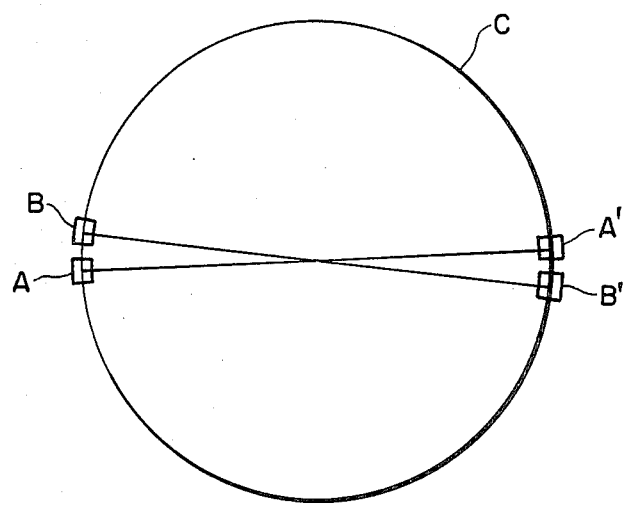
FIGS. 1 and 2 are illustrations of video transducer heads which are employed in the video tape recorder of the invention.
Figure 2:
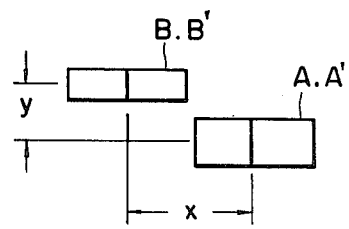
Figure 3:
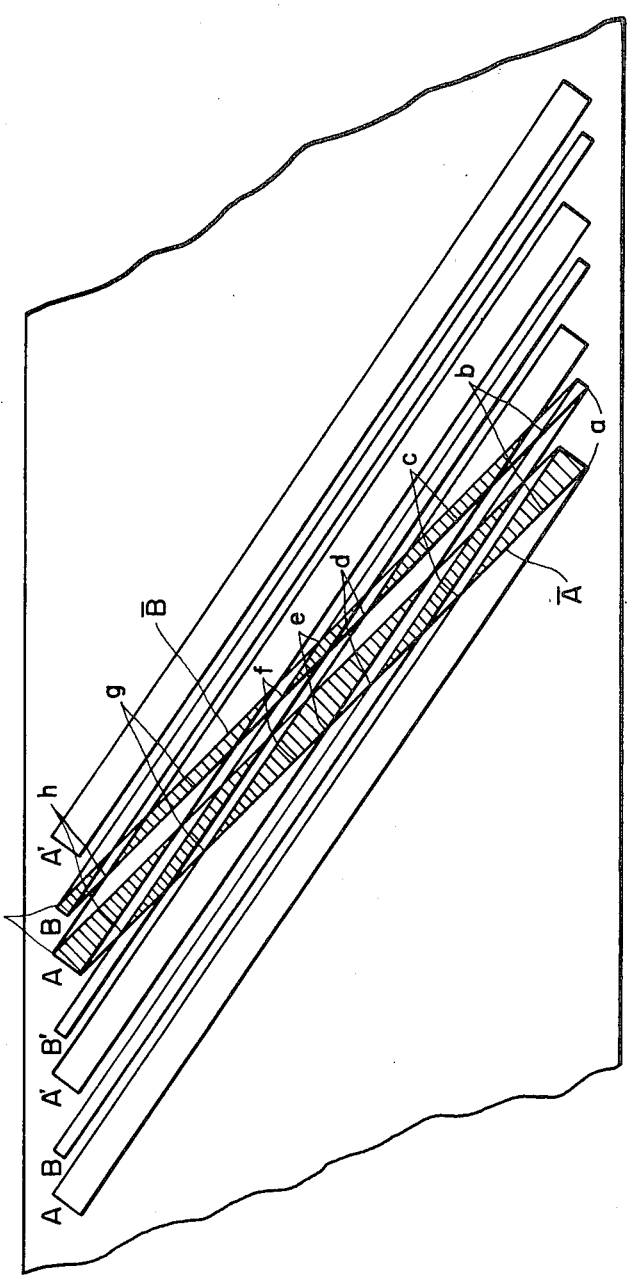
FIG. 3 is an illustration of tracks recorded by the video heads of FIGS. 1 and 2 in relation to the paths of the heads during slow-motion or the like mode.

In FIGS. 1 and 2 video transducer heads employed in the present invention are illustrated for the purpose of disclosure. A first pair of video heads A and A' is mounted diametrically opposite to each other on the circumference of a rotary cylinder C, each being spaced on centers a distance x in the horizontal direction from one of a second pair of diametrically oppositely mounted video heads B and B' and further spaced on centers a distance y in the vertical direction from the video head B (B'). The video heads A, A' and B, B' are used for recording and reproducing luminance and chrominance signals, respectively. For wide bandwidth recording and reproduction the heads A, A' have a greater core width than that of the heads B, B'. During normal modes of recording and reproduction, the video heads A, A', B and B' move in a given direction skewed with respect to the direction of movement of magnetic tape as indicated by tracks A, A', B and B' in FIG. 3. However, during a special operating mode such as reproduction of a stationary image, slow-motion image, or fast-motion image, the cylinder C is driven at a manually selectable speed which differs from the speed at which the cylinder is driven during recording, so that the video heads are oriented at different angles during such operational modes and move along paths as indicated at $\overline{A}$ and $\overline{B}$ in FIG. 3. Therefore, the video heads A and A' pick up unwanted chrominance signals as well as luminance signal as they move from one track to another, while the video heads B and B' pick up unwanted luminance signals.

Figure 6A:
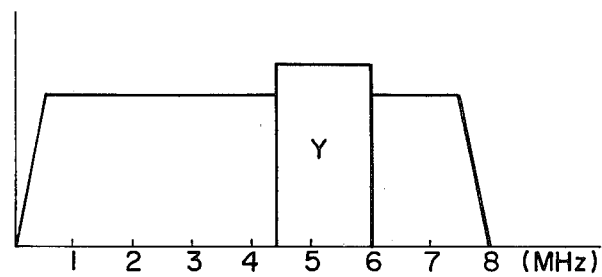
FIGS. 6a and 6b are graphic illustrations of the frequency spectrum of the luminance and chrominance signals, respectively.
Figure 6B:
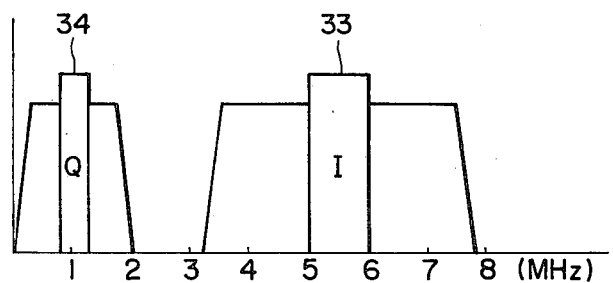
Figure 4:
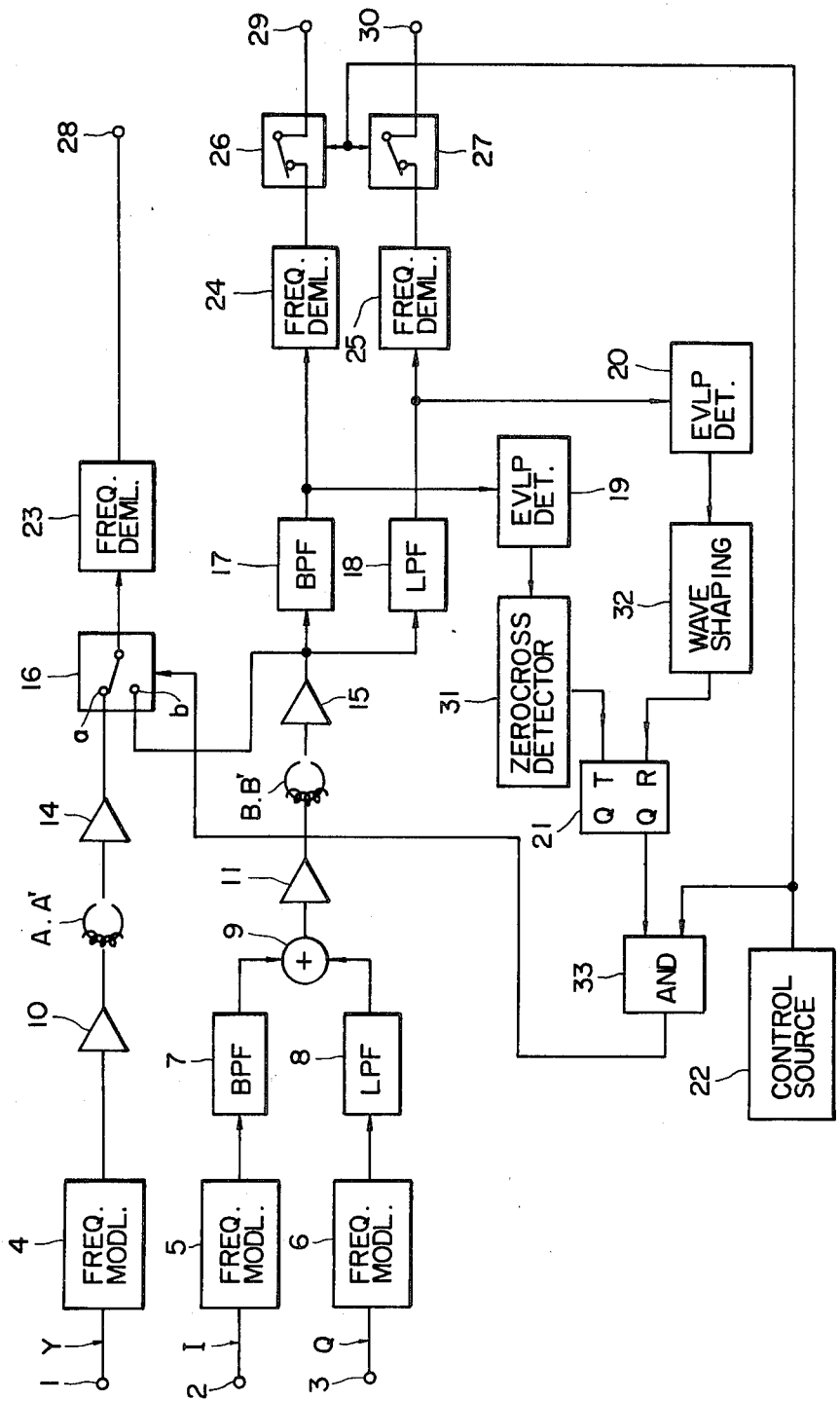
FIG. 4 is an illustration of a block diagram of a circuit embodying the present invention.

A circuit shown in FIG. 4 eliminates the unwanted signals. The circuit comprises frequency modulators 4, 5 and 6 connected respectively to input terminals 1, 2 and 3 on which Y, I and Q signals are impressed respectively. The Y signal having a bandwidth of 4 MHz is applied to the frequency modulator 4 to modulate a carrier applied thereto with a maximum frequency shift which preferably ranges from 4.4 MHz to 6 MHz, the frequency spectrum of the Y-signal modulated carrier being shown in FIG. 6a. The Y-signal modulated carrier is applied to the video heads A and A' at alternate horizontal intervals after amplification at 10. The I signal is applied to the frequency modulator 5 to modulate a carrier applied thereto and fed to a bandpass filter 7 having a passband of about 3 MHz to 8 MHz for application to an input of an adder 9. The Q signal is applied to the frequency modulator 6 to modulate a carrier supplied thereto and passed to a lowpass filter 8 having a frequency range of up to 2 MHz and fed to another input of the adder 9, whereby the I- and Q-signal modulated carriers are frequency division multiplexed in the adder 9 and fed to the video heads B and B' at alternate horizontal intervals after amplification at 11. The frequency spectrum of the I- and Q-signal modulated carriers are illustrated in FIG. 6b.

During normal mode of reproduction, the signals recorded on tracks A and A' are reproduced by video heads A, A' and after amplification at 14 applied to the a terminal of a switch 16 and thence to a frequency demodulator 23 for application of demodulated Y signal to an output terminal 28. The signals recorded on tracks B, B' are reproduced by heads B, B' and amplified at 15 and passed through a bandpass filter 17 and a lowpass filter 18 for frequency demultiplexing to deliver the I- and Q-signal modulated carriers to frequency demodulators 24 and 25, respectively. To the outputs of the frequency demodulators 24 and 25 are provided normally closed switches 26 and 27, respectively, which are arranged to open the output circuits of the demodulators 24 and 25 to their respective output terminals 29 and 30 in response to a command signal supplied from a control source 22.

The chrominance output from the amplifier 15 is also impressed on the b terminal of the changeover switch 16 for application to the frequency demodulator 23 instead of the Y signal in a manner as will be described.

To the output of the bandpass filter 17 is connected an envelope detector 19 which detects the envelope of the I-signal modulated carrier and applies the detected envelope to a zero crossing detector 31. The zero crossing detector 31 produces a pulse when the envelope signal drops to a level close to or at the zero voltage level and triggers a flip-flop 21. The $\overline{Q}$ output of the flip-flop 21 is applied to an input of an AND gate 33 which receives its other input signal from the control source 22 to pass the $\overline{Q}$ output of the flip-flop 21 to the control terminal of the changeover switch 16. A second envelope detector 20 is connected to the output of the lowpass filter 18 to detect the envelope of the Q-signal modulated carrier. The Q-signal envelope is waveshaped at 32 to generate rectangular pulses which are supplied to the reset input of the flip-flop 21 to determine the polarity or binary level of the $\overline{Q}$ output of the flip-flip 21.

Figure 5:
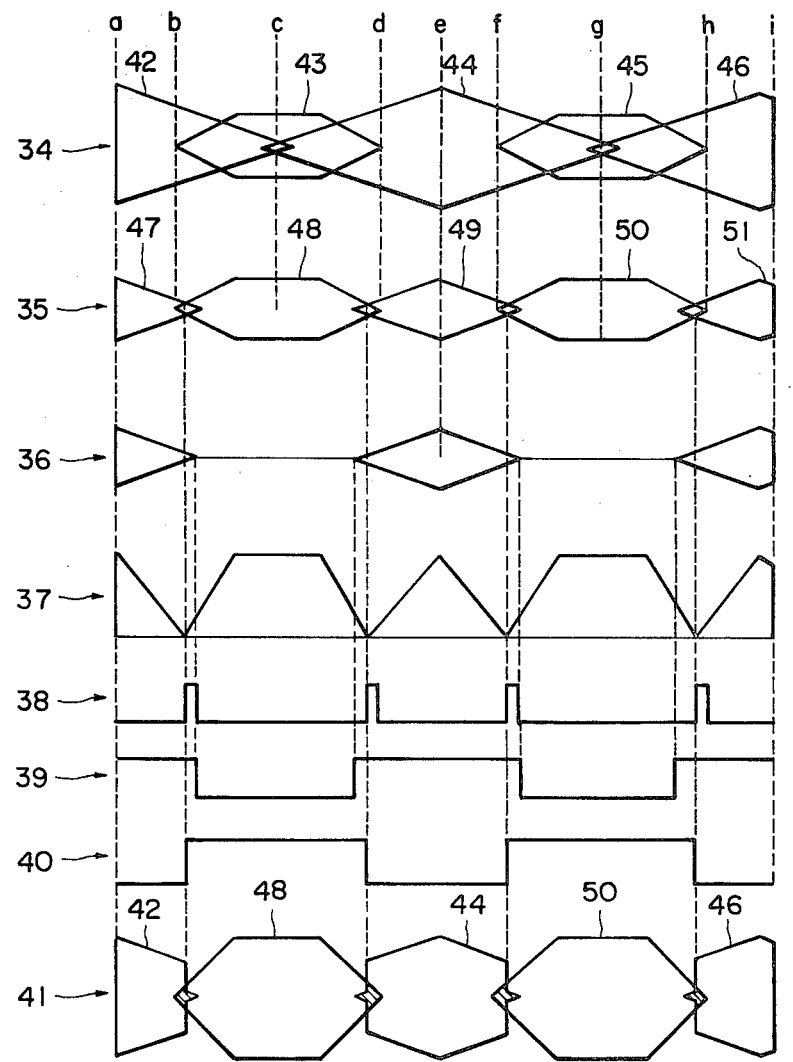
FIG. 5 is an illustration of various waveforms which appear in the circuit of FIG. 4.

The operation of the circuit of FIG. 4 will be visualized with reference to FIG. 5. The waveform indicated at 34 is the signal derived from the heads A, A'. The portions of the waveform indicated at 42, 44 and 46 are the Y-signal modulated carrier derived from the portions of the track $\overline{A}$ which are identified by hatched areas "a to c", "c to g" and "g to i", respectively, in FIG. 3. The intermediate portions 43 and 45 are the multiplexed chrominance signal which are identified by hatched portions "b to d" and "f to h", respectively, and partially intermixed with a portion of the luminance signal. The waveform 35 is derived from the video heads B, B' in which the portions indicated at 47, 49 and 51 are the multiplexed chrominance signal generated from the hatched portions of the track $\overline{B}$ "a to b", "d to f" and "h to i", respectively, while the portions 48 and 50 are the luminance signal derived from the hatched portions "b to d" and "f to h", respectively, which are serially combined, or interleaved with each other.

Since the output of the bandpass filter 17 is a signal which lacks the Q-signal component of the chrominance signal, the same waveform as 36 is applied to the envelope detector 19. On the other hand, since the Y and I signal components are eliminated by the lowpass filter 18 from the waveform 35, a waveform shown at 36 is applied to the envelope detector 20. The output of the envelope detector 19, shown schematically at 37, is applied to the zero crossing detector 31 which compares the detected envelope with a reference level which is near or at the zero voltage level to detect the minimum peak, or trough of the envelope which occurs at intermediate points between waveform portions 47 and 48; 48 and 49; 49 and 50; and 50 and 51. Pulses shown at 38 are generated from the zero crossing detector 31 in response to each minimum peak point of the detected envelope. Concurrently, the output of the envelope detector 20 is applied to the waveshaping circuit 32 where the detected envelope of the Q-signal modulated carrier is amplified and shaped into a rectangular waveform 39 which changes from a high to a low level at a point immediately after a zero crossing pulse 38 and changes from a low to a high voltage level at a point immediately prior to a subsequent zero crossing pulse. The output pulse 39 of the wave-shaping circuit 32 serves to condition the flip-flop 21 so that in the presence of a high voltage level at the reset input of the flip-flop 21 the occurrence of a trigger pulse from the zero crossing detector 31 drives the $\overline{Q}$ output to a high voltage level generating a waveform shown at 40 at the $\overline{Q}$ output of the flip-flop 21.

During the special control mode, the AND gate 33 is enabled by a command signal from the control source 22 to pass the high voltage signal from the flip-flop 21 to the changeover switch 16 to switch its moving contact from the a position to the b position to couple the output of the amplifier 15. Therefore, during the interval from b to d, the intermixed noise 43 is replaced with luminance component 48 and during the interval from f to h the intermixed noise 45 is replaced with luminance component 50, whereby the input signal to the frequency demodulator 23 is free from unwanted signals as shown at 41 in FIG. 3. In the presence of the command signal from the control source 22, the switches 26 and 27 are open to cut off the chrominance signals to allow reproduction of a black-and-white picture.

To make the level of the Y-signal components 48 and 50 consistent with the level of the Y-signal components 42, 44 and 45, it is preferable to provide an amplifier in the circuit between the output of amplifier 15 and the b terminal of the changeover switch 16.

While the waveform 41 contains a certain amount of noise during switching as indicated by hatched areas, the level of the noise is significantly lower than the noise level encountered with conventional systems.

Since the luminance signal derived from the video heads B, B' must be synchronized with the signal derived from the video heads A, A' to assure continuity, the horizontal sync pulses recorded in each of the luminance signal tracks must be in registry with those recorded in each of the chrominance signal tracks.

Figure 7:
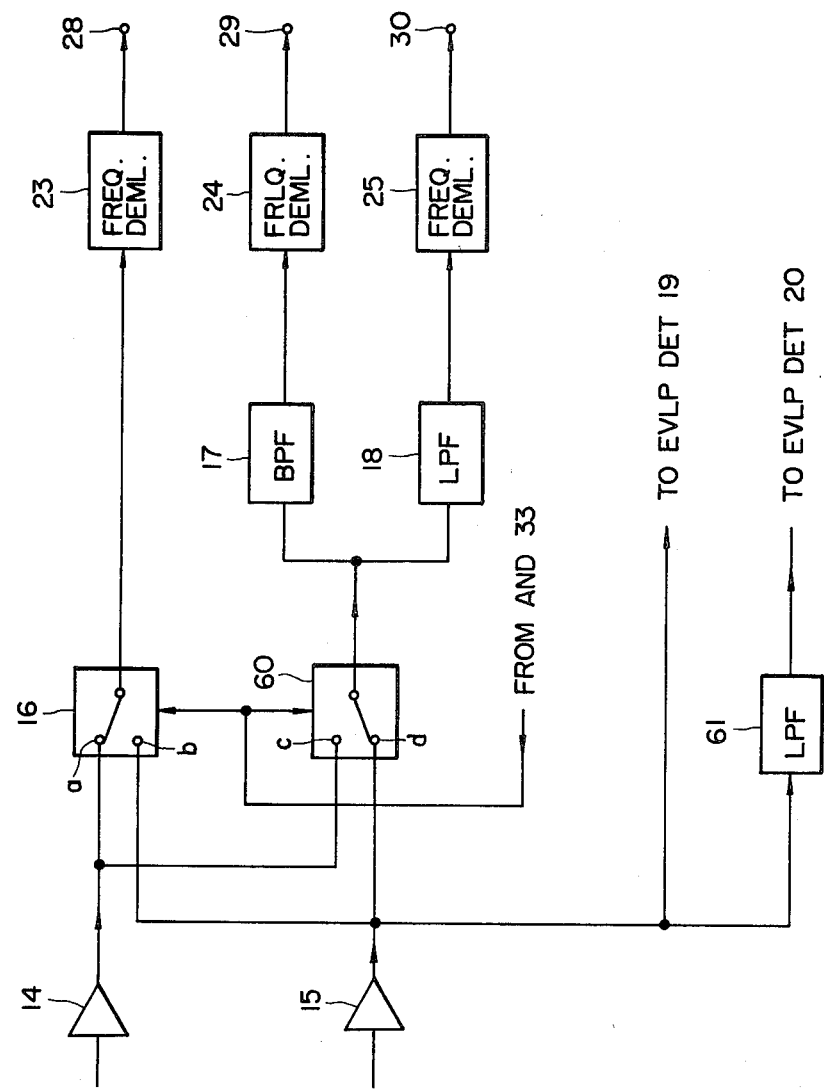
FIG. 7 is an illustration of a block diagram of a modified embodiment of the invention.

Although the chrominance components 43 and 45 contain luminance components as seen in FIG. 5, color reproduction may be useful for certain applications. FIG. 7 is an illustration of a modified embodiment which permits color reproduction in which parts corresponding to those in FIG. 4 are marked with the same numerals as those in FIG. 4. The circuit of FIG. 7 differs from the previous embodiment in that it includes a second changeover switch 60, and a lowpass filter 61 connected to the output of the amplifier 15. The second switch 60 is provided with terminals c and d connected to the output of the amplifiers 14 and 15, respectively, and receives the same switching control signal from the output of the AND gate 33 as that applied to the first switch 16. The switch 60 has its moving contact normally connected to the terminal d to couple the output of the amplifier 15 to the filters 17 and 18 when the voltage level of the control signal is low and switches its moving contact to the terminal c in response to the control signal having a high voltage level. The envelope detector 19 takes its input from the output of the amplifier 15 rather than from the output of the bandpass filter 17 since the output signal of the latter changes from the waveform 35, FIG. 5, after the switch 60 is switched to the c position. For the same reason the envelope detector 20 takes its input from the output of the lowpass filter 18.

While in the previous embodiments, the I and Q signals are frequency division multiplexed by frequency modulating carriers of different frequencies, the present invention could be applied equally as well to systems in which the I and Q signals are modulated by different techniques (for example, I signal is used to frequency modulate a high frequency carrier, while the Q signal is used to amplitude modulate a lower frequency carrier), or I and Q signals are alternately used to frequency modulate a carrier, or I and Q signals are time division multiplexed into a combined signal which is used to frequency modulate a carrier.

Various modifications are apparent to those having ordinary skill in the art without departing from the scope of the present invention which is only limited by the appended claims. For example, the control signal 40 shown in FIG. 5 can also be derived from a circuit in which the waveforms 38 and 39 are reversed in polarity by inverters and combined in an AND gate and applies an output of this AND gate to the AND gate 33.

What is claimed is:

1. A video tape recording and reproducing apparatus having first and second transducer heads adapted to receive first and second input recording signals respectively and mounted on the circumference of a rotary cylinder normally driven at a speed having a predetermined relationship with the speed of movement of the recording tape during recording, the recording signals being recorded along alternate tracks skewed relative to the length of the tape, said cylinder being drivable during a slow-motion playback mode or the like for scanning the skewed tracks on the tape at a manually selectable speed different from the speed at which said rotary cylinder is normally driven during recording of said signals, thereby causing said transducer heads to traverse several tracks for each line scan of said tape by said transducer heads and producing unwanted signals having a sharply transitory waveform, comprising detecting means for detecting a transitory point of said waveform and generating therefrom a control signal, and coupling means responsive to said control signal for selectively coupling one of a plurality of playback signals derived from said first and second transducer heads to a utlilization circuit.

2. Apparatus as claimed in claim 1, wherein said first transducer head has a greater core width than the core width of said second transducer head to permit said first recording signal to be recorded on a track having a greater width than the width of the track of said second recording signal.

3. Apparatus as claimed in claim 2, wherein said first and second recording signals are luminance and chrominance signals, respectively.

4. Apparatus as claimed in claim 2, 3, or 1 wherein said coupling means comprises a pair of switch means for normally coupling the outputs of said first and second transducer heads to first and second utilization circuits respectively, and for reversing the coupling in response to said control signal.

5. Apparatus as claimed in claim 3, wherein said second recording signal comprises first and second different frequency color signal components which are frequency division multiplexed prior to recording on a common track, and wherein said detecting means comprises filter means for deriving said first and second color signal components from said second transducer head, envelope detectors coupled to said filter means to detect the envelope of said color signal components, a zero crossing detector coupled to one of said envelope detectors, and a bistable device having a first input coupled to the output of said zero crossing detector and a second, resetting input means coupled to the output of another envelope detector for generating said control signal from the output of said bistable device.

6. Apparatus as claimed in claim 5, wherein said first and second color signal components are I and Q signals respectively.

7. Apparatus as claimed in claim 6, further comprising means for disabling the playback signal derived from said second transducer head when the apparatus is in said slow-motion or the like mode.

8. A video tape recorder as claimed in claim 6, further comprising means for demodulating said I and Q signals, output terminals for outputting said demodulated I and Q signals, and means for controllably disabling passage of said demodulated I and Q signals to said output terminals when said cylinder is driven at said manually selectable speed.

9. A video tape recording and reproducing apparatus having first and second transducer heads adapted to receive first and second input recording signals respectively and mounted on the circumference of a rotary cylinder normally driven at a speed having a predetermined relationship with the speed of movement of the recording tape during recording, the recording signals being recorded along alternate tracks skewed relative to the length of the tape, said cylinder being drivable during a special playback mode for scanning the skewed tracks on the tape at a manually selectable speed having a relationship with the speed of movement of the tape which is different from the predetermined relationship at which said signals are recorded, thereby causing said transducer heads to traverse several tracks for each scan of said tape by said transducer heads and producing unwanted signals having a sharply transitory waveform, comprising detecting means for detecting a transitory point of said waveform and generating therefrom a control signal, and coupling means responsive to said control signal for selectively coupling one of a plurality of playback signals derived from said first and second transducer heads to a utilization circuit.

10. A video tape recorder as claimed in claim 9, wherein said second recording signal comprises first and second components of different frequencies which are recorded in the form of frequency-division multiplexed signals on a common track, and wherein said detecting means comprises means for separating a signal reproduced by said second transducer head to recover said first and second components, and means for detecting the envelope of said first and second different frequency components for generating said switching control signal.

* * * * *